UNITED STATES PATENT OFFICE.

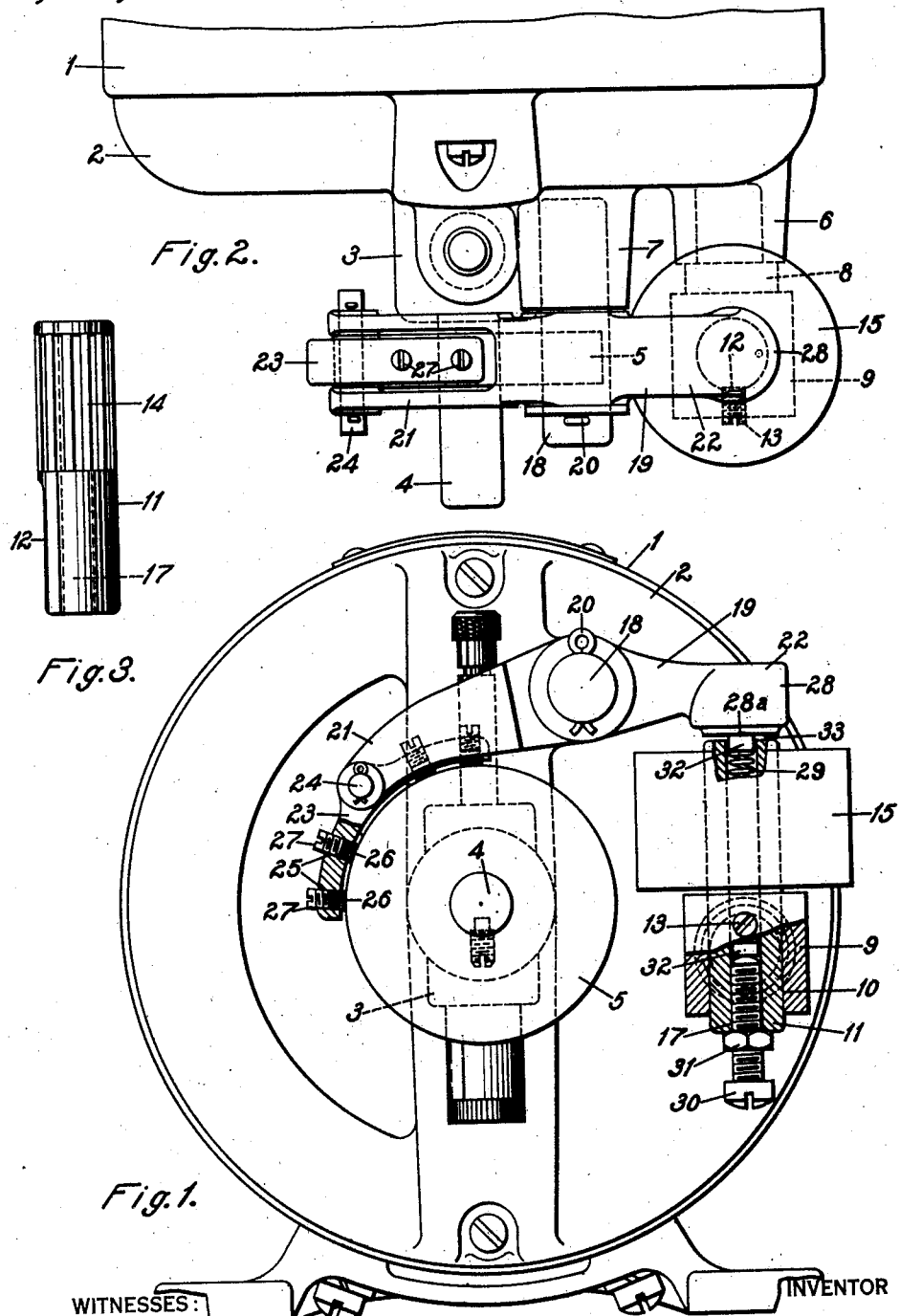

CLIFFORD A. M. WEBER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTROMAGNETIC BRAKING DEVICE.

1,392,032. Specification of Letters Patent. Patented Sept. 27, 1921.

Application filed November 3, 1916. Serial No. 129,299.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Electromagnetic Braking Devices, of which the following is a specification.

My invention relates to electromagnetic braking devices for electric motors and it has for its object to provide a braking device that shall be quick and positive in action, and that may be readily adjusted to meet varying braking requirements.

A further object of my invention is to provide a braking device that may be conveniently embodied in the structure of existing types of electric motors.

In the accompanying drawings, Figure 1 is a view, in end elevation, of an electric motor provided with a braking device constructed in accordance with my invention, Fig. 2 is a plan view of a portion of the motor shown in Fig. 1, and Fig. 3 is a detail view of the core member of the electromagnetic device.

The motor comprises a frame 1 to one end of which is secured a bearing bracket 2 that is provided with a centrally located bearing 3. An armature shaft 4 is rotatably mounted in the bearing 3, and a brake wheel 5 is carried on a portion of the shaft 4 that projects beyond the bearing 3. The bearing bracket 2 is further provided with projecting lugs 6 and 7 that are preferably formed integral therewith but may be welded or otherwise secured thereto.

The lug 6 is provided with an opening within which is secured a magnet post 8 that extends longitudinally with respect to the shaft 4. The post 8 terminates in a substantially cubical portion 9 that is provided with a central opening 10 within which is located a cylindrical magnet core 11. As best shown in Fig. 3, the portion of the core 11 that is located within the opening 10 is provided with a groove or slot 12, and a set screw 13, extending through one wall of the portion 9, coacts therewith to secure the core 11 in any desired position. The core 11 is further provided with a knurled portion 14, and a magnet coil 15, provided with a central opening, is pressed upon the knurled portion 14 which securely holds the coil in place without further fastening means. The core 11 is provided with a central opening 17 extending therethrough, the purpose of which will be hereinafter described.

The lug 7 is provided with an opening within which is secured a pin 18 that extends substantially parallel to the magnet post 8. An armature member 19 is pivotally mounted on the pin 18 and is secured thereon by means of a cotter pin 20 coacting with a hole provided in the end of the pin 18. The armature 19 comprises oppositely extending arms 21 and 22, the arm 21 being bifurcated and curved to substantially conform to the periphery of the brake wheel 5. A brake shoe 23 is pivotally mounted, at its middle portion, between the arms of the bifurcated portion 21 by a pin 24. The brake shoe is provided with tapped openings 25, and cylindrical portions 26, of a suitable material having a high coefficient of friction, are located therein and are held in close engagement with the periphery of the braking wheel 5 by adjusting studs 27.

The arm 22 of the armature 19 terminates in a rounded portion 28 provided with a flat face 28$^a$ that is of substantially the same cross sectional area as the core 11. A resilient member 29, which is shown as a coil spring, is located in the opening 17 of the core 11 and is held in engagement with the face 28$^a$ by means of an adjusting screw 30 that is in threaded engagement with a portion of the opening 17. The spring 29 tends to move the armature 19 about its pivotal support away from the core 11 and to cause the brake shoe 23 to engage the periphery of the brake wheel 5. The tension of the spring may be adjusted by a screw 30, a lock nut 31 being provided to maintain the screw in any desired position. Disks 32, preferably composed of brass or other suitable non-magnetic material, are interposed between the respective ends of the spring 29 and the face 28$^a$ and the set screw 30, in order to prevent the spring from catching in the threads or around the edges of the opening 17. A small pin 33 of non-magnetic material projects from the face 28$^a$ a few thousandths of an inch in order to prevent the armature 19 from sticking when attracted by the core 11. The magnet coil 15 is adapted to be energized from a suitable source of electrical energy (not shown) so that the armature 19 is attracted during the operation of the motor, thereby holding the brake 23 out of engagement with the brake wheel 5. As soon as power is shut off from the motor, the coil 15 is deënergized, whereupon the spring 29 forces the armature away from the core, and the brake 23 is quickly and positively applied.

From the foregoing, it is apparent that an electromagnetic braking device, constructed in accordance with my invention, may be applied to an electric motor by merely providing suitable supporting lugs on one of the end brackets thereof, the lugs forming a portion of the magnetic circuit of the device. Furthermore, the pressure applied to the brake wheel, and the magnetic pull exerted upon the armature by the core member may be so varied that the motor may be brought to a standstill, either at once or after several revolutions of the brake wheel. Wear of the frictional material may be readily compensated for by turning the studs on the brake shoe.

While I have shown my invention in its simplest and preferred form, it is not so limited but is susceptible of various minor changes and modifications within the scope of the appended claims.

I claim as my invention:

1. In a dynamo-electric machine, the combination with an armature shaft, and a bearing bracket for rotatably supporting said shaft and provided with projections integral therewith, of an electric magnetic braking device for said shaft comprising a braking member, a core member carried by one of said projections and an armature pivotally mounted on another of said projections and adapted to operate said braking member.

2. In a dynamo-electric machine, the combination with an armature shaft, and a bearing bracket for rotatably supporting said shaft and provided with projections integral therewith, of an electromagnetic braking device for said shaft comprising a brake shoe, a core member carried by one of said projections and an armature pivotally mounted on another of said projections, whereby the said bracket forms a portion of the magnetic circuit of said device, said armature being adapted to move said brake shoe to retard said shaft.

3. In a dynamo-electric machine, the combination with an armature shaft, and a bearing bracket for rotatably supporting said shaft and provided with projections integral therewith, of an electromagnetic braking device for said shaft comprising a braking member, a core member carried by one of said projections and an armature pivotally mounted on another of said projections and adapted to operate said braking member to retard said shaft, the said core member being adjustable with respect to said armature.

4. In a dynamo-electric machine, the combination with a bearing bracket provided with projections integral therewith, of an electromagnetic braking device comprising a core member carried by one of said projections and longitudinally adjustable with respect thereto.

5. In an electromagnetic braking device, the combination with a rotatable shaft, a braking member, a core member, and a pivotally mounted armature member operatively connected to said braking member, of adjustable means carried by said core member for biasing said armature member to move said braking member in the direction of said shaft.

6. In an electromagnetic braking device, the combination with a rotatable shaft, a brake shoe therefor, a core member and a pivotally mounted armature member operatively connected to said brake shoe, of a resilient member located within said core member for biasing said armature member to move said brake shoe in the direction of said shaft, and means for adjusting the tension of said resilient member.

7. In an electromagnetic braking device, the combination with a rotatable shaft, a core member, and a pivotally mounted armature member provided with a brake shoe, of a spring located within said core member and coacting with the face of said armature member for maintaining said brake shoe in engagement with said shaft.

8. In an electromagnetic braking device, the combination with a rotatable shaft, a core member, and a pivotally mounted armature member provided with a brake shoe, of a spring located within said core member and having one end coacting with the face of said armature member for maintaining said brake shoe in engagement with said shaft, and means for adjusting the tension of said spring.

9. In a dynamo-electric machine, the combination with a bearing bracket provided with projections integral therewith, of an electromagnetic braking device comprising a core member mounted on one of said projections, and an armature pivotally mounted on another of said projections, the magnetic circuit of said device comprising said core member, said armature, said projections and said bearing bracket.

10. In a dynamo-electric machine, the combination with an armature shaft, a brake mounted thereon and a bearing bracket for rotatably supporting said shaft and provided with projections integral therewith, of an electromagnetic braking device for said shaft comprising a braking member, a core member mounted on one of said projections, a magnet coil mounted on said core member, an armature pivotally mounted on another of said projections and operatively connected to said braking member, the magnetic circuit of said device comprising said core, the projection on which the core is mounted, said bearing bracket, the projection supporting said armature, and the armature.

In testimony whereof, I have hereunto subscribed my name this 30th day of Oct. 1916.

CLIFFORD A. M. WEBER.